(12) United States Patent
Harriman

(10) Patent No.: US 7,545,134 B2
(45) Date of Patent: Jun. 9, 2009

(54) POWER SUPPLY CONTROLLER AND METHOD THEREFOR

(75) Inventor: Paul J. Harriman, Goodyear, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 33 days.

(21) Appl. No.: 11/776,843

(22) Filed: Jul. 12, 2007

(65) Prior Publication Data

US 2009/0015217 A1    Jan. 15, 2009

(51) Int. Cl.
*H02M 3/156* (2006.01)
*G05F 1/00* (2006.01)
(52) U.S. Cl. .................. 323/351; 323/271; 323/285
(58) Field of Classification Search .............. 323/208, 323/266, 271, 284, 285, 288, 293, 351, 352
See application file for complete search history.

(56) References Cited

U.S. PATENT DOCUMENTS

| 5,905,370 | A | 5/1999 | Bryson |
| 6,424,132 | B1 | 7/2002 | Wrathall |
| 6,674,325 | B2 | 1/2004 | Chen et al. |
| 6,894,466 | B2 | 5/2005 | Huang et al. |
| 7,057,381 | B2 | 6/2006 | Harriman et al. |
| 7,230,406 | B2 * | 6/2007 | Huang et al. ............... 323/222 |
| 2006/0171179 | A1 * | 8/2006 | Hall et al. .................. 363/95 |

* cited by examiner

*Primary Examiner*—Jessica Han
*Assistant Examiner*—Emily Pham
(74) *Attorney, Agent, or Firm*—Robert F. Hightower

(57) ABSTRACT

In one embodiment, a power supply controller is configured to form a reference signal that has selectable values. The power supply controller is also configured to form a feed-forward signal in response to change in the value of the reference voltage and to use this feed-forward signal control the value of an output current.

17 Claims, 2 Drawing Sheets

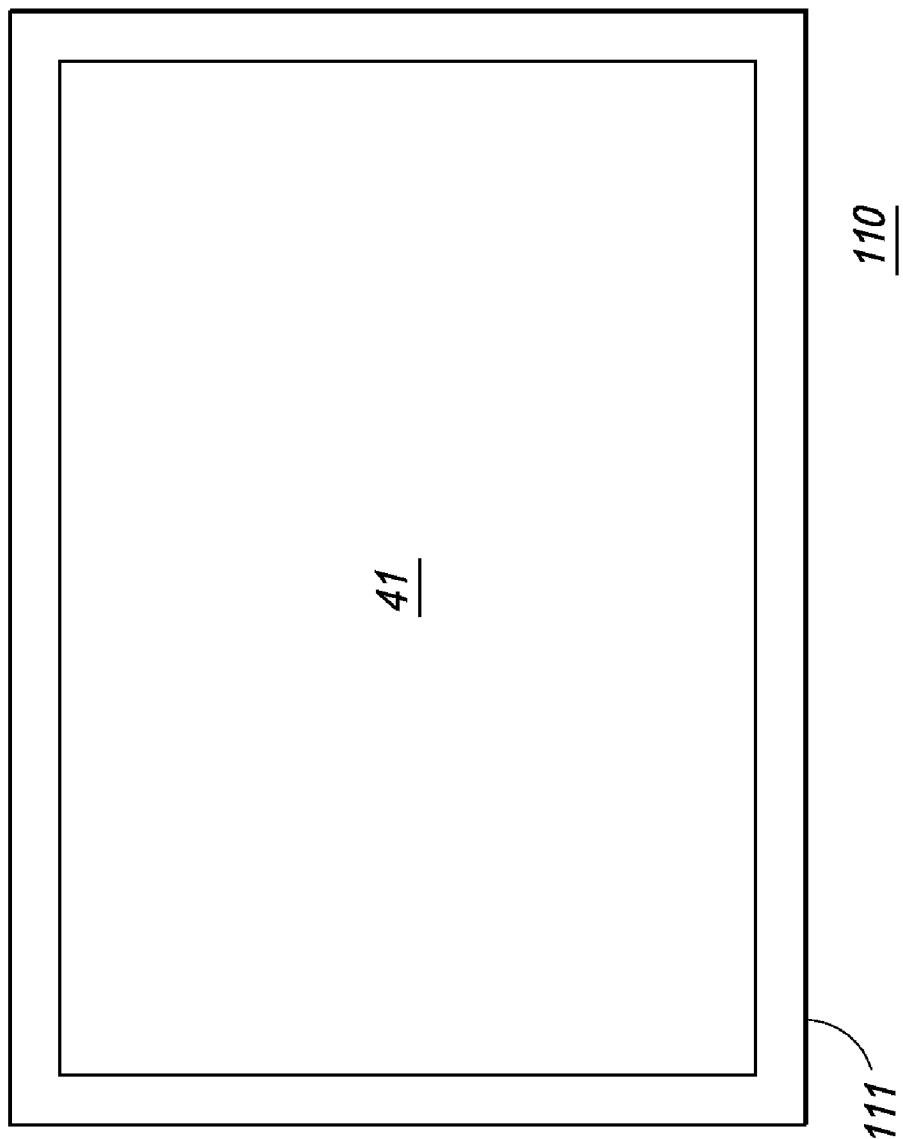

US 7,545,134 B2

POWER SUPPLY CONTROLLER AND METHOD THEREFOR

CROSS-REFERENCE TO RELATED APPLICATIONS

This application is related to U.S. Pat. No. 7,057,381 that issued to Harriman et. al. on Jun. 6, 2006 having a common assignee herewith.

BACKGROUND OF THE INVENTION

The present invention relates, in general, to electronics, and more particularly, to methods of forming semiconductor circuits.

In the past, the semiconductor industry utilized various methods and circuits for forming the error amplifier of a power supply control system such as a pulse width modulated (PWM) system. Advances in technology increased the demand for more efficient and more accurate power supply control systems. Often, systems required the ability to change the value of the output voltage of the power supply system under the control of an external control system such as a micro-computer. The external control system typically sent a signal to the power supply control system in order to change the value of the output voltage. In order to reduce decouple capacitor requirements, the control system generally had a programmable output impedance (often referred to as "droop"). One problem with these power supply controllers was accuracy. Often, when the value output voltage was changed the system had to supply extra current in order to charge the output capacitors of the system to the new desired voltage. However, the programmable output impedance caused a delay in charging the output capacitors which reduced the accuracy of the control system. Such inaccuracy and instability detrimentally affected the operation of the control system that used the output voltage of the power control system.

Accordingly, it is desirable to have a power supply controller that reduces the time required to change the output voltage from one value to a new value, and that more accurately changes the output voltage to the desired value.

BRIEF DESCRIPTION OF THE DRAWINGS

FIG. 2 schematically illustrates an enlarged plan view of a portion of an embodiment of a semiconductor device that includes the power supply controller of FIG. 1 in accordance with the present invention.

Figure 1:
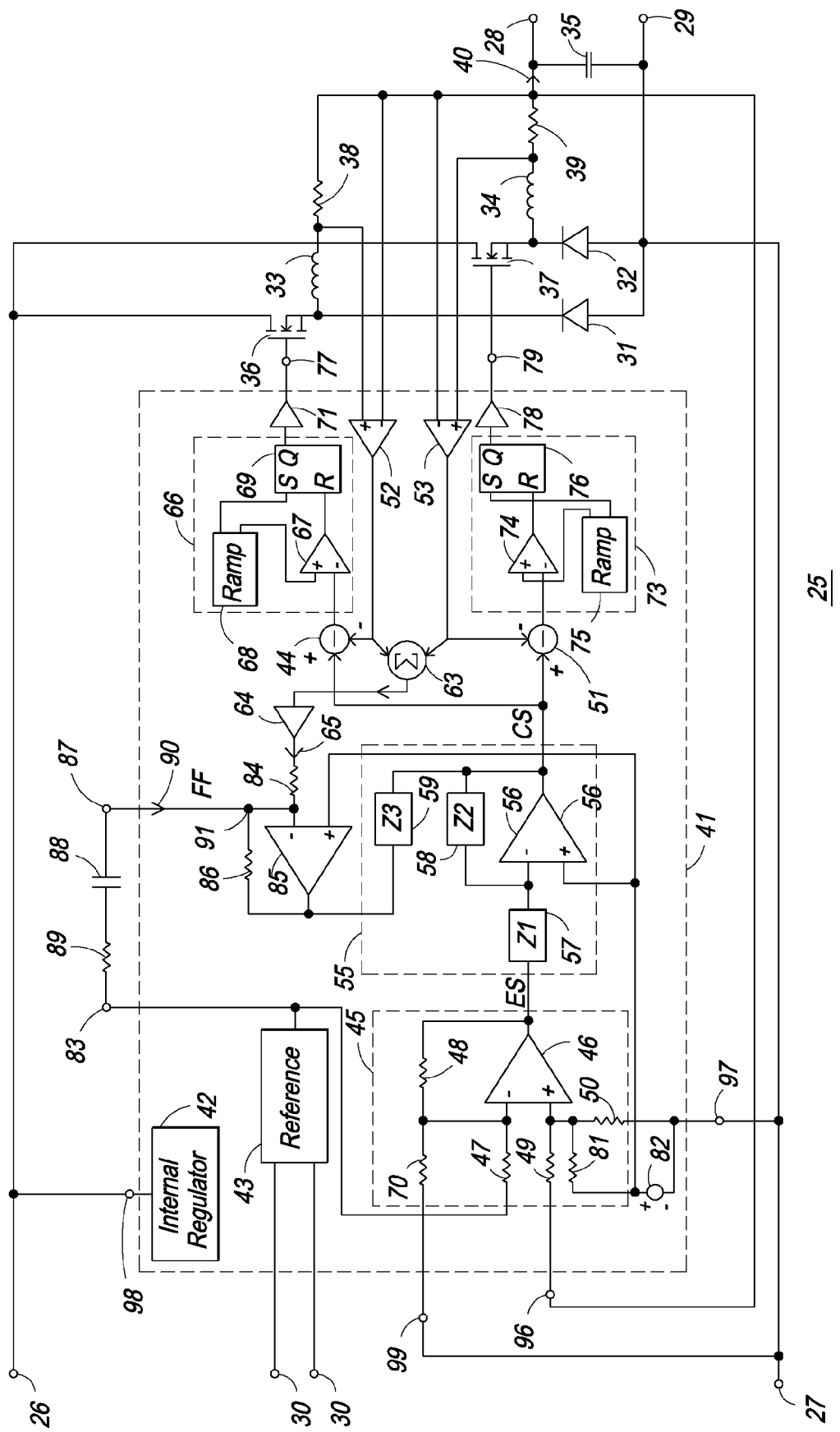
FIG. 1 schematically illustrates an embodiment of a portion of a power supply control system that includes a portion of an exemplary embodiment of a power supply controller in accordance with the present invention.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

FIG. 1 schematically illustrates an embodiment of a portion of a power supply control system 25 that accurately and quickly and accurately changes an output voltage of system 25 in response to changes in a reference voltage of system 25 and in response to changes of the output voltage of system 25. System 25 includes a differential error amplifier 45 that provides a substantially constant gain for changes in both a feedback signal and the reference voltage over the operating frequency of the PWM control signals formed by system 25. This functionality facilitates system 25 quickly and accurately controlling the value of the output voltage, especially in response to changes in a reference voltage, as will be seen further hereinafter.

System 25 receives power between a power input 26 and a power return 27, and provides an output voltage between an output voltage terminal 28 and output common terminal 29. A power supply controller 41 of system 25 is formed and configured to control the value of the output voltage. System 25 typically includes energy storage inductors 33 and 34, a bulk energy storage capacitor 35, a first power switch or power transistor 36, a second power switch or power transistor 37, a first current sense resistor 38, a second current sense resistor 39, and diodes 31 and 32. Transistors 36 and 37 preferably are MOS power transistors that are connected to respective inductors 33 and 34 in order to provide a charging current to charge bulk capacitor 35 and form the output voltage between terminals 28 and 29. In other embodiments, the power switch may be a bipolar transistor or other type of switch that can enable and disable the charging current flow through inductors 33 and 34. Transistors 36 and 37, resistors 38 and 39, diodes 31 and 32, and inductors 33 and 34 typically are external to controller 41 although in some cases transistors 36 and 37 may be a part of controller 41. Current sense resistors 38 and 39 form a first current sense signal and a second current sense signal, respectively, that are representative of the charging current. In the preferred embodiment of system 25, the value of the feedback signal is small, consequently a differential feedback signal is used to improve the noise immunity and accuracy of system 25. In this preferred embodiment, the output voltage between terminals 28 and 29 is received as a differential feedback (FB) signal or feedback signal between feedback inputs 96 and 99 of controller 41. This differential feedback signal is representative of the output voltage. In other embodiments, the feedback signal may be single ended and applied only to input 96, thus, resistor 70 and input 99 would typically be connected to return 97.

Controller 41 includes differential error amplifier 45, a voltage reference generator or reference 43, a compensation amplifier 55, an offset voltage or offset 82, and a feed-forward circuit that includes a feed-forward resistor 89 and a feed-forward capacitor 88, and gain resistors 84 and 86. Resistor 89 and capacitor 88 usually are external to a semiconductor die on which controller 41 is formed as illustrated by the connection to terminals 83 and 87 of controller 41. Controller 41 also includes an amplifier 85 with gain resistor 86, an inverting amplifier 64, a resistor 84, subtractor circuits or subtractors 44 and 51, a summing circuit 63, current sense amplifiers 52 and 53, a first pulse width modulated (PWM) controller or PWM controller 66, a second PWM controller 73, a first power switch driver 71, and a second power switch driver 78. Controller 41 also typically includes an internal regulator 42 that is configured to provide an internal operating voltage for elements within controller 41 including differential error amplifier 45, compensation amplifier 55, amplifier 85, PWM controller 66, PWM controller 73, and reference 43. Although not shown for clarity of the drawing, regulator 42 typically is connected between a power input 98 and a power return 97 of controller 41. Return 97 generally is connected to return 27. In the preferred embodiment of system 25, return 27 is connected to terminal 29 so that the output voltage is referenced to power return 27. In other embodiments, the output voltage may be isolated from the input voltage and terminal 29 would be isolated from return 27. Reference 43 provides a reference voltage on an output of reference 43. The value of the reference voltage can be changed externally to controller 41 through a plurality of control inputs 30 of controller 41. Typically, inputs 30 are digital signals that are received by reference 43. Changing the value of the signal on inputs 30 changes the value of the reference voltage on the output of reference 43.

System 25 is illustrated to have a plurality of power control channels including a first power control channel that includes controller 66, driver 71, and a first power stage that includes transistor 36 and inductor 33, and a second power control channel that includes controller 73, driver 78, and a second power stage that includes transistor 37 and inductor 34. The PWM control signals from the PWM controllers generally are formed to enable the power switches at different times and are often referred to as operating with different phases. In other embodiments, system 25 may have more than two power control channels or may have only one. PWM controller 66 includes a PWM comparator 67, a PWM ramp generator or ramp 68, and a PWM latch 69. Similarly, PWM controller 73 includes a PWM comparator 74, a ramp generator or ramp 75, and a PWM latch 76. Ramps 68 and 75 each generate a clock signal that is used to set respective latches 69 and 76, and ramps 68 and 75 also each generate a ramp signal that is applied to an input of respective comparators 67 and 74. Setting latches 69 and 76 drives the outputs of drivers 71 and 78 high to begin enabling transistors 36 and 37, respectively. The output of comparators 67 and 74 are used to clear respective latches 69 and 76 and begin disabling respective transistors 36 and 37. Controllers 66 and 73 generate PWM control signals on a Q output of respective latches 69 and 76 that are used to control respective transistors 36 and 37. Transistor drivers 71 and 78 receive the PWM control signals from respective controllers 66 and 73 and form respective first and second PWM drive signals for enabling and disabling respective transistors 36 and 37. The first and second PWM drive signals generally are coupled to respective first and second drive outputs 77 and 79 of controller 41. Such PWM controllers, transistor drivers, PWM control signals, and PWM drive signals are well known to those skilled in the art. Current sense amplifiers 52 and 53 are configured to receive the current sense signals across respective resistors 38 and 39 and responsively form respective first and second current feedback signals on the output of respective amplifiers 52 and 53. Summing circuit 63 receives the first and second current feedback signals and responsively sums them to form a composite current feedback signal on an output of circuit 63. The composite current feedback signal is buffered by amplifier 64.

Differential error amplifier 45 is configured to have substantially constant gain for the reference voltage (Vref) and for the feedback (FB) signal over the operating frequency range of the PWM control signals from controllers 66 and 73. With such a configuration, the effect of changes in the value of the reference voltage and changes in the FB signal through amplifiers 45 and 55 is constant over the operating frequencies. Configuring the error amplifier to have substantially constant gain for both the reference voltage and for the feedback signal over the operating frequency of controller 41 improves the transient response of system 25 in addition to the stability and accuracy of the output voltage of system 25. The approximately constant gain generally is over a frequency range of about dc to twenty (20) MHz and preferably is from dc to at least ten (10) MHz. In the preferred embodiment, amplifier 45 has unity gain over this frequency range.

Differential error amplifier 45 receives the differential feedback (FB) signal between the inverting and non-inverting inputs of amplifier 45. The feedback signal is referenced to return 97 through resistor 48 and the reference voltage is referenced to return 97 through resistor 50. Thus, amplifier 45 subtracts the value of the reference voltage from the value of the feedback signal, and responsively amplifies the difference between the values of the reference voltage and the feedback signal. Differential error amplifier 45 includes an operational amplifier 46, a first gain resistor 47, a second gain resistor 48, a third gain resistor 49, and a fourth gain resistor 50. Resistors 47, 48, 49, 50, 70, and a resistor 81 are selected to provide the desired value of the gain from the feedback signal and the reference voltage to the error signal. Offset 82 provides an offset voltage that creates a floating analog ground to bias the signals of amplifiers 45, 55, and 85 above the potential of return 97. The resulting transfer function of amplifier 45 is:

$$ES = (((R48/R49)(FB1)) + ((R48/R81)(V82))) *$$
$$((1/R48) + (1/R70) + (1/R47))/((1/R49) + (1/R81) + (1/R50)) -$$
$$FB2(R48/R70) - Vref(R48/R47)$$

Where:
ES—is the value of the output voltage of amplifier 45;
FB1—is the value of the feedback signal applied to input 96 relative to return 97;
FB2—is the value of the feedback signal applied to input 99 relative to return 97;
Vref—is the value of the reference voltage applied to the second input of amplifier 45;
V82—is the value of the voltage provided by offset 82;
R47—is the value of resistor 47;
R48—is the value of resistor 48;
R49—is the value of resistor 49;
R50—is the value of resistor 50;
R70—is the value of resistor 70; and
R81—is the value of resistor 81.

The goal is to configure amplifier 46 and resistors 47-50, and 70 so that the gain for changes in the FB signal and the gain for changes in the reference voltage are constant over the operating frequency of the PWM control signals. However, as is well known in the art there are always minor variances that prevent the gains from being identically equal. It is well established in the art that variances of up to about ten percent (10%) are regarded as reasonable variances from the ideal goal of exactly constant. In the embodiment of controller 41 formed on a semiconductor die, resistors 47-50 and 70 typically are internal to the semiconductor die but may be external in some embodiments.

Compensation amplifier 55 includes an amplifier 56 that has a frequency compensation network that includes a first impedance 57 and a second impedance 58. Impedances 57 and 58 are selected to provide high-frequency stability for the control loop of system 25 and to provide a high gain at low frequencies in order to provide good DC regulation for system 25. The value of impedances 57 and 58 are selected to provide the desired high-frequency stability and high dc gain for compensation amplifier 55. The value of impedance 59 is selected to provide a controlled output impedance for system 25. In the embodiment of controller 41 formed on a semiconductor die, the components of impedances Z1, Z2, and Z3 typically are external to the semiconductor die. Compensation amplifier 55 receives the sum of the error signal (ES) from differential error amplifier 45 and the signal from the output of amplifier 85 and compensates the summed signal to form a compensated signal (CS) that provides the poles and zeros that are necessary to generate the desired stability. Thus, amplifier 55 applies a varying phase with frequency to the received ES signal over at least a portion of the operating frequency range of controller 41. The compensated signal (CS) from the output of compensation amplifier 55 is received by subtractors 44 and 51 which subtracts the value of the respective first and second current feedback signals in order to provide controller 41 with forced current sharing between the channels of system 25 and increased output voltage stability. The current corrected signals from subtractors 44 and 51 are received by respective comparators 67 and 74 of controllers 66 and 73, respectively. The value of the current corrected signal sets the value at which comparators 67 and 74 clear respective latches 69 and 76 and begin disabling respective transistors 36 and 37.

As can be seen, forming amplifier 45 to subtract the reference voltage from the error signal and forming amplifier 55 to provide separate signal compensation allows amplifier 45 to amplify changes in the reference voltage with a first gain that is substantially constant over the operating frequency and to amplify changes in the feedback signal with a second gain that is substantially constant over the operating frequency. Additionally, the frequency compensation provided by impedances 57 and 58 can be change or modified without affecting the gain vs frequency relationships between the reference voltage and the feedback voltage. The resulting transfer function of amplifier 45 is:

$$ES = (((R48/R49)(FB1)) + ((R48/R81)(V82))) *$$
$$((1/R48) + (1/R70) + (1/R47))/((1/R49) + (1/R81) + (1/R50)) -$$
$$FB2(R48/R70) - Vref(R48/R47)$$

The feed-forward circuit that includes capacitor 88 and resistor 89 is configured to reduce the time required to change the output voltage from one value to a new value in response to a change in the value of the reference voltage formed by reference 43. When the value of the output voltage is changed, a portion of output current 40 is used to charge bulk capacitor 35 and a portion is provided to the load (not shown) that is connected between terminals 28 and 29. As will be seen further hereinafter, the feed-forward circuit causes controller 41 to increase the value of current 40 by an amount that is substantially equal to the amount of current that is required to charge bulk capacitor 35. This reduces the amount of time required for the output voltage to reach the new value in response to the change in the value of the reference voltage.

If the value of the reference voltage from reference 43 changes (increases for example), amplifier 45 receives the change and the error signal (ES) oppositely changes (decreases for example) which results in an opposite change (increase for example) in the value of output current 40. Additionally, the change in the value of the reference voltage from reference 43 causes a time varying current 90 to flow through the feed-forward network of resistor 89 and capacitor 88 at node 91 (into the inverting input of amplifier 85 for example.) This causes an opposite change in the output of amplifier 85 (decreases for example). The signal from amplifier 85 propagates through impedance 59 (Z3) and is summed to the change in the ES signal and causes a further change (increase for example) in the compensated error signal (CS) than the change that was caused by the change in the error signal (ES), thus, a corresponding further change (increase for example) in the value of output current 40. The total changed value of current 40 (increase for example) causes a corresponding change in the value of the output of amplifiers 52 and 53, and in the value of the output of summing circuit 63. Inverting amplifier 64 receives the changed (increased for example) output of circuit 63 and oppositely changes (decreases for example) the value of current 65. The decrease in current 65 sums with the increase in current 90 which reduces the value of the output of amplifier 85 as the value of output current 40 changes in response to the change in the reference voltage from reference 43. The time constant of resistor 89 and capacitor 88 is chosen to be substantially the same as the time constant provided by capacitor 35 and the parasitic resistance thereof. The value of resistor 89 is chosen so that the maximum value of current 90 is substantially equal to current 65 so that the two currents may cancel each other out as the value of current 40 increases. Making the two currents cancel ensures that controller 41 only supplies the extra load current resulting from current 90 until capacitor 35 is charged to the new output voltage value that results from the change in the value of the reference voltage from reference 43. Once capacitor 35 is charged to the new value, the value of current 65 becomes zero and the value of current 90 decreases as capacitor 88 becomes charged. Because the two time constants are substantially equal, current 90 changes at the same rate that the voltage on capacitor 35 changes. The time constant of the feed-forward circuit generally changes the value of output current 40 before the output of amplifier 45 can change current 40. The feed-forward circuit quickly provides a time varying change in the value of the CS signal and current 40 that is in addition to the change caused by the ES signal from amplifier 45. It can be seen that amplifier 85, resistors 84 and 86, amplifier 64, and amplifier 55 form a first circuit that assists the feed-forward circuit. It is believed that the feed-forward circuit, along with amplifiers 64 and 85, reduces the time required to charge capacitor 35 by close to one hundred percent (100%) so that value of the output voltage changes almost simultaneously with the change in the value of the reference voltage.

In order to provide the hereinbefore described functionality, an inverting input of amplifier 46 is commonly connected to a first terminal of resistors 47, 70, and 48. A second terminal of resistor 70 is connected to input 99 of controller 41. A second terminal of resistor 48 is connected to the output of amplifier 46 and to a first terminal of impedance 57. A second terminal of resistor 47 is connected to the output of reference 43. A non-inverting input of amplifier 46 is commonly connected to a first terminal of resistors 49, 50, and 81. A second terminal of resistor 49 is connected to feedback input 96 and a second terminal of resistor 50 is connected to return 97. A second terminal of resistor 81 is connected to a first terminal of offset 82 which has a second terminal connected to return 97. An input of regulator 42 is connected to input 98 of controller 41. A second terminal of impedance 57 is commonly connected to an inverting input of amplifier 56, to a first terminal of impedance 59, and to a first terminal of impedance 58. A second terminal of impedance 58 is commonly connected to the output of amplifier 56, to a first input of subtractor 44, and to a first input of subtractor 51. A second terminal of impedance 59 is connected to the output of amplifier 85 and to a first terminal of resistor 86. A second terminal of resistor 86 is commonly connected to a first terminal of resistor 84, the inverting input of amplifier 85, and a first terminal of capacitor 88. A second terminal of capacitor 88 is connected to a first terminal of resistor 89 which has a second terminal connected to the output of reference 43. A second terminal of resistor 84 is connected to the output of amplifier 64 which has an input connected to the output of circuit 63. A second input of subtractor 44 is commonly connected to a first input of circuit 63 and an output of amplifier 52. An output of subtractor 44 is connected to the inverting input of comparator 67. A second input of subtractor 51 is commonly connected to a second input of circuit 63 and to an output of amplifier 53. An output of subtractor 51 is connected to the inverting input of comparator 74. A non-inverting input of comparator 67 is connected to a first output of ramp 68, and an output of comparator 67 is connected to a reset input of latch 69. A set input of latch 69 is connected to a second output of ramp 68, and a Q output of latch 69 is connected to an input of driver 71. An output of driver 71 is connected to output 77 of controller 41. A non-inverting input of comparator 74 is connected to a first output of ramp 75, and an output of comparator 74 is connected to a reset input of latch 76. A set input of latch 76 is connected to a second output of ramp 75. A Q output of latch 76 is connected to an input of driver 78, and an output of driver 78 is connected to an output 79 of controller 41. Inputs 30 of controller 41 are connected to the inputs of reference 43. Output 77 of controller 41 is connected to a gate of transistor 36 which has a drain connected to input 26, and a source commonly connected to a first terminal of diode 31 and to a first terminal of inductor 34. Output 79 of controller 41 is connected to a gate of transistor 37 which has a drain connected to input 26, and a source commonly connected to a first terminal of resistor 39 and to a first terminal of inductor 34. A second terminal of inductors 33 and 34 are connected to a first terminal of respective resistors 38 and 39, and to a non-inverting input of respective amplifiers 52 and 53. A second terminal of resistors 38 and 39 are connected to respective inverting inputs of amplifiers 52 and 53, and to terminal 28. A second terminal of diodes 31 and 32 are connected to terminal 29.

FIG. 2 schematically illustrates an enlarged plan view of a portion of an embodiment of a semiconductor device 110 that is formed on a semiconductor die 111. Controller 41 is formed on die 111. Die 111 may also include other circuits that are not shown in FIG. 2 for simplicity of the drawing. Controller 41 and device 110 are formed on die 111 by semiconductor manufacturing techniques that are well known to those skilled in the art.

In view of all of the above, it is evident that a novel device and method is disclosed. Included, among other features, is forming a feed-forward circuit that changes the load current in response to changes in the reference voltage. The additional load current causes the output voltage to rapidly change in response to the change in the reference voltage.

While the invention is described with specific preferred embodiments, it is evident that many alternatives and variations will be apparent to those skilled in the semiconductor arts. The exemplary embodiment of controller 41 is illustrated with differential error amplifier 45 along with a plurality of PWM channels, however, those skilled in the art will appreciate that amplifier 45 may be a single ended amplifier, and that the feed-forward circuit may be used with a single PWM control channel.

The invention claimed is:

1. A power supply controller comprising:
a reference generator operably coupled to form a reference signal and configured to selectively form a value of the reference signal;
an error amplifier operably coupled to receive the reference signal and to receive a feedback signal that is representative of an output voltage of a power supply control system, and to responsively form an error signal;
a feed-forward circuit configured to form a feed-forward signal that is representative of a change in the value of the reference signal wherein a value of the feed-forward signal changes for a first time interval responsively to a change in the value of the reference signal wherein the feed-forward circuit includes an RC network coupled to receive the reference signal and form the feed-forward signal responsively to a change in the value of the reference signal;
a first circuit configured to combine the feed-forward signal and the error signal to form a compensated signal; and
a PWM channel configured to form a PWM drive signal, the PWM channel coupled to use the compensated signal to form a duty cycle of the PWM drive signal.

2. The power supply controller of claim 1 wherein the first circuit includes a first amplifier coupled to receive the feed-forward signal and coupled to receive a current sense signal that is representative of a charging current used to generate the output voltage, and wherein the first amplifier sums the feed-forward signal and the current sense signal to form a current error signal, the first amplifier having a first input, a second input, and an output.

3. The power supply controller of claim 2 wherein the first circuit sums the current error signal and the error signal.

4. The power supply controller of claim 2 wherein the RC network includes a resistor having a first terminal and having a second terminal coupled to receive the reference signal, a capacitor having a first terminal coupled to the first terminal of the resistor and having a second terminal, the first input of the first amplifier coupled to the second terminal of the capacitor and coupled to receive a signal that is representative of the current sense signal, and the second input of the first amplifier coupled to receive an offset voltage.

5. The power supply controller of claim 2 wherein the first circuit includes a second amplifier that sums the current error signal and the error signal and forms the compensated signal.

6. The power supply controller of claim 5 wherein the second amplifier includes a first input coupled to receive the error signal and the current error signal, a second input coupled to receive an offset voltage, and an output coupled to provide the compensated signal.

7. A method of controlling a power supply system having an output voltage comprising:
coupling a PWM controller to form a PWM drive signal for controlling a value of the output voltage;
configuring the power supply system to form a feedback signal representative of the value of the output voltage;
configuring an adjustable reference generator to form a reference signal having a selectable value;

coupling an error amplifier to receive the feedback signal and the reference signal and responsively form an error signal;

coupling a feed-forward circuit to form a feed-forward signal that is representative of a change in the value of the reference signal; and configuring a first circuit to sum the error signal and the feed-forward signal to form a compensated signal that is used to control a duty cycle of the PWM drive signal.

8. The method of claim 7 wherein coupling the error amplifier to receive the feedback signal includes coupling the error amplifier to subtract the reference signal from the feedback signal to form a difference signal and coupling the error amplifier to amplify the difference signal.

9. The method of claim 7 further including coupling the PWM controller to form a current sense signal that is representative of a value of an output current that is required to charge an output capacitor of the power supply system to a new voltage value responsively to the change in the reference signal.

10. The method of claim 9 further including configuring the first circuit to combine the current sense signal with the feed-forward signal.

11. A method of forming a power supply controller comprising:

coupling an error amplifier to receive a feedback signal that is representative of a voltage external to the power supply controller, to receive a reference signal having a value that is selectable, and to responsively form an error signal;

configuring a feed-forward circuit to form a feed-forward signal that is representative of a change in the value of the reference signal;

configuring a first circuit to combine the feed-forward signal and the error signal to form a compensated signal; and configuring a PWM channel to use the compensated signal to control a duty cycle of a PWM drive signal formed by the PWM channel.

12. A method of forming a power supply controller comprising:

coupling an error amplifier to receive a feedback signal that is representative of a voltage external to the power supply controller and to receive a reference signal having a value that is selectable;

configuring a feed-forward circuit to form a feed-forward signal that is representative of a change in the value of the reference signal including coupling an RC network to receive the reference signal and responsively form the feed-forward signal having a value that changes over a time interval responsively to the change in the value of the reference signal wherein the time interval is determined by a series coupled resistor and capacitor of the RC network;

configuring a first circuit to combine the feed-forward signal and the error signal to form a compensated signal; and configuring a PWM channel to use the compensated signal to control a duty cycle of a PWM drive signal formed by the PWM channel.

13. The method of claim 12 wherein forming the RC network includes coupling a first terminal of the resistor to receive the reference signal, coupling a second terminal of the resistor to a first terminal of the capacitor and coupling a second terminal of the capacitor to form the feed-forward signal.

14. The method of claim 12 wherein configuring the first circuit includes coupling a first input of a first amplifier to receive the feed-forward signal and coupling a signal on an output of the first amplifier to combine with the error signal.

15. The method of claim 14 further including coupling the power supply controller to receive a current sense signal that is representative of a current through a power control switch that is controlled by the PWM channel and coupling the first amplifier to sum the feed-forward signal with the current sense signal.

16. The method of claim 14 further including configuring a second amplifier to receive the error signal and to receive the output of the first amplifier and to sum the error signal and the signal on the output of the first amplifier to form the compensated signal.

17. The method of claim 16 further including coupling a first terminal of a first impedance to receive the error signal and coupling a second terminal of the first impedance to a first input of the second amplifier, and coupling a first terminal of a second impedance to the output of the first amplifier and coupling a second terminal of the second impedance to the first input of the second amplifier.

* * * * *